(12) United States Patent
Yamaguchi

(10) Patent No.: US 6,246,143 B1
(45) Date of Patent: Jun. 12, 2001

(54) FLAT CORELESS VIBRATOR MOTOR USING MAGNETIC LATCHING POWER

(75) Inventor: Tadao Yamaguchi, Isesaki (JP)

(73) Assignee: Tokyo Parts Industrial Co., Ltd., Gunma-ken (JP)

( * ) Notice: Subject to any disclaimer, the term of this patent is extended or adjusted under 35 U.S.C. 154(b) by 0 days.

(21) Appl. No.: 09/528,981

(22) Filed: Mar. 20, 2000

(51) Int. Cl.$^7$ .............................. H02K 13/04; H02K 7/75
(52) U.S. Cl. ....................... 310/233; 310/81; 310/40 MM
(58) Field of Search ............................ 310/81, 233, 236, 310/237, 242, 244; 29/596–598

(56) References Cited

U.S. PATENT DOCUMENTS

| | | | |
|---|---|---|---|
| 3,538,365 | * 11/1970 | Reisnecker | 310/233 |
| 5,036,239 | 7/1991 | Yamaguchi | 310/268 |
| 5,793,133 | * 8/1998 | Shiraki et al. | 310/81 |
| 5,942,833 | * 8/1999 | Yamaguchi | 310/81 |

* cited by examiner

*Primary Examiner*—Tran Nguyen
(74) *Attorney, Agent, or Firm*—Leydig, Voit & Mayer, Ltd.

(57) ABSTRACT

A flat coreless vibrator motor holds a rotor in a specific position by magnetic flux from a magnet, increasing vibration by increasing the eccentricity of the center of gravity of the rotor, easily moving since the adjacent segments of a commutator are not short-circuited, and having reduced manufacturing costs. In the flat coreless vibrator motor, a four-pole magnet which has alternate north and south poles for providing a magnetic field to an eccentric rotor faces the eccentric rotor, in one side of which at least one coreless coil is located and in which a commutator having four segments, each diametrically-opposite pair of which are short-circuited, is installed. The flat coreless vibrator motor includes a unit for holding the at least one coreless coil of the eccentric rotor so that available conductor portions are at a specific position when the eccentric rotor stops, using the magnetic power of the magnet, a pair of brushes for supplying power to the eccentric rotor through the commutator in a position where the angle formed by the commutator and the brushes is 90°, and a protrusion arranged between the segments of the commutator coplanar with surfaces of the segments so that the adjacent segments are not short-circuited by the brushes and the brushes do not touch the protrusion.

20 Claims, 10 Drawing Sheets

FLAT CORELESS VIBRATOR MOTOR USING MAGNETIC LATCHING POWER

BACKGROUND OF THE INVENTION

1. Field of the Invention

The present invention relates to a flat coreless vibrator motor using magnetic latching power suitable for use as a silent alert source for a small, portable communication device such as a radio pager or a portable telephone or a vibration source for a massager.

2. Description of the Related Art

A conventional flat coreless vibrator motor is disclosed in U.S. Pat. No. 5,036,239.

The flat coreless vibrator motor where a number of, for example, three armature coils 99 are eccentrically arranged is popular in the market since it is possible to control the amount of eccentricity of the center of gravity of a rotor to be large. However, it costs much to manufacture the flat coreless vibrator motor of the three coil type since there are three coils. Also, as shown in U.S. Pat. No. 5,036,239, in the flat coreless vibrator motor of the three coil type, all the coils contribute to the production of torque during a rotation for only an extremely short time and, in general, current flows through only two coils according to the principle of the rotation.

SUMMARY OF THE INVENTION

To solve the above problem, it is an object of the present invention to provide a flat coreless vibrator motor capable of holding a rotor in a specific position so as to effectively obtain a magnetic flux from a magnet by magnetic latching power, increasing vibration by increasing the amount of eccentricity of the center of gravity of the rotor, improving the mobility of the rotor since the adjacent segments of a commutator are not shorted, and whose manufacturing expenses are cut down by reducing the number of coils or the available sectional area of a magnet.

Accordingly, to achieve the above object, there is provided a flat coreless vibrator motor using magnetic latching power, comprising an eccentric rotor in one side of which at least one coreless coil is arranged and in which a commutator is installed, a magnet for providing a magnetic field to the eccentric rotor, means for holding at least one coreless coil of the eccentric rotor in a specific position using the magnetic power of the magnet, a pair of brushes for supplying power to the eccentric rotor through the commutator, and a protrusion arranged between segments so that the adjacent segments of the commutator are not shorted by the brushes.

It is possible to improve the mobility of the flat coreless vibrator motor since the eccentric rotor is held in a specific position when it stops and to prevent adjacent segments from being shorted by the protrusion.

At least one of the two sides of the protrusion is preferably a concave portion.

It is possible to prevent abrasion powder such as a synthetic resin from gathering in the concave part of the protrusion and coming out to the surfaces of the segments.

The commutator is formed on a printed circuit board to be of a flat type, the protrusion is formed of the printed circuit board, and the concave portion is formed by performing etching.

It is possible to easily form the protrusion.

It is preferable that there are two coreless coils and that one of the two coreless coils is formed by winding magnetic plated wire as means for holding the coreless coils at specific positions.

It is possible to hold the eccentric rotor in the specific position by only the coil when it stops.

The coreless coil formed by winding the magnetic plated wire has a smaller number of windings than the other coreless coil or less magnetic latching power is used in the coreless coil formed by winding the magnetic plated wire.

It is possible to reduce mobility torque since the magnetic latching power is not very large.

The width of the magnet (the difference between the outer diameter of the magnet and the inner diameter of the magnet) is preferably almost equal to the inner diameter of the coil.

It is possible not to increase the manufacturing expenses of a magnet and to firmly hold the eccentric rotor in the specific position by the available conductor portions of the coil since the unavailable conductor portions of the coil is not attracted by the magnet.

To achieve the above object, there is provided a flat coreless vibrator motor, comprising an eccentric rotor, in one side of which at least one coreless coil is arranged and in which a commutator having four segments each diametrically-opposite pair of which are shorted is installed, a four-pole magnet which has alternate north and south poles for providing a magnetic field to the eccentric rotor, means for holding the at least one coreless coil of the eccentric rotor so that available conductor portions are at a specific position when the eccentric rotor stops using the magnetic power of the magnet, a pair of brushes for supplying power to the eccentric rotor through the commutator in a position where the angle formed by the commutator and the brushes is 90°, and a protrusion arranged between the segments of the commutator to have the same level as the level of the surfaces of the segments so that the adjacent segments are not shorted by the brushes and that the brushes do not touch the protrusion.

It is possible to improve the mobility of the eccentric rotor since the eccentric rotor is held in a specific position when it stops and to prevent the adjacent segments from being shorted by the protrusion.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENTS

In FIGS. 1 through 4, an eccentric rotor 1 is integrally formed of a high density, slippery synthetic resin 4, with two coreless armature coils 2 and 3 tilted to one side. One having the two coreless armature coils is the coreless armature coil 2 formed by winding magnetic plated wire of a very thin plating. The coreless armature coil 2 formed by winding the magnetic plated wire has a relatively larger winding axis (namely, the diameter of a through hole in the coil is made larger) and a smaller number of windings than the other coreless armature coil 3 in order to prevent the generation of large magnetic attractive power. A magnet 5 of a disk-shape having a central hole, which faces the eccentric rotor 1, is magnetized so that it has alternate north and south poles N and S and is divided uniformly by four. The width of the magnet 5 is almost equal to the width of the through hole in the coreless armature coil 2. The position of the outer periphery of the magnet 5 coincides with the position of the outer periphery of the through hole in the coreless armature coil 2. The position of the inner periphery of the magnet 5 coincides with the position of the outer periphery of the through hole in the coreless armature coil 2. Namely, the through hole in the coreless armature coil 2 is arranged to overlap the outer periphery and the inner diameter of the magnet 5.

Figure 1:
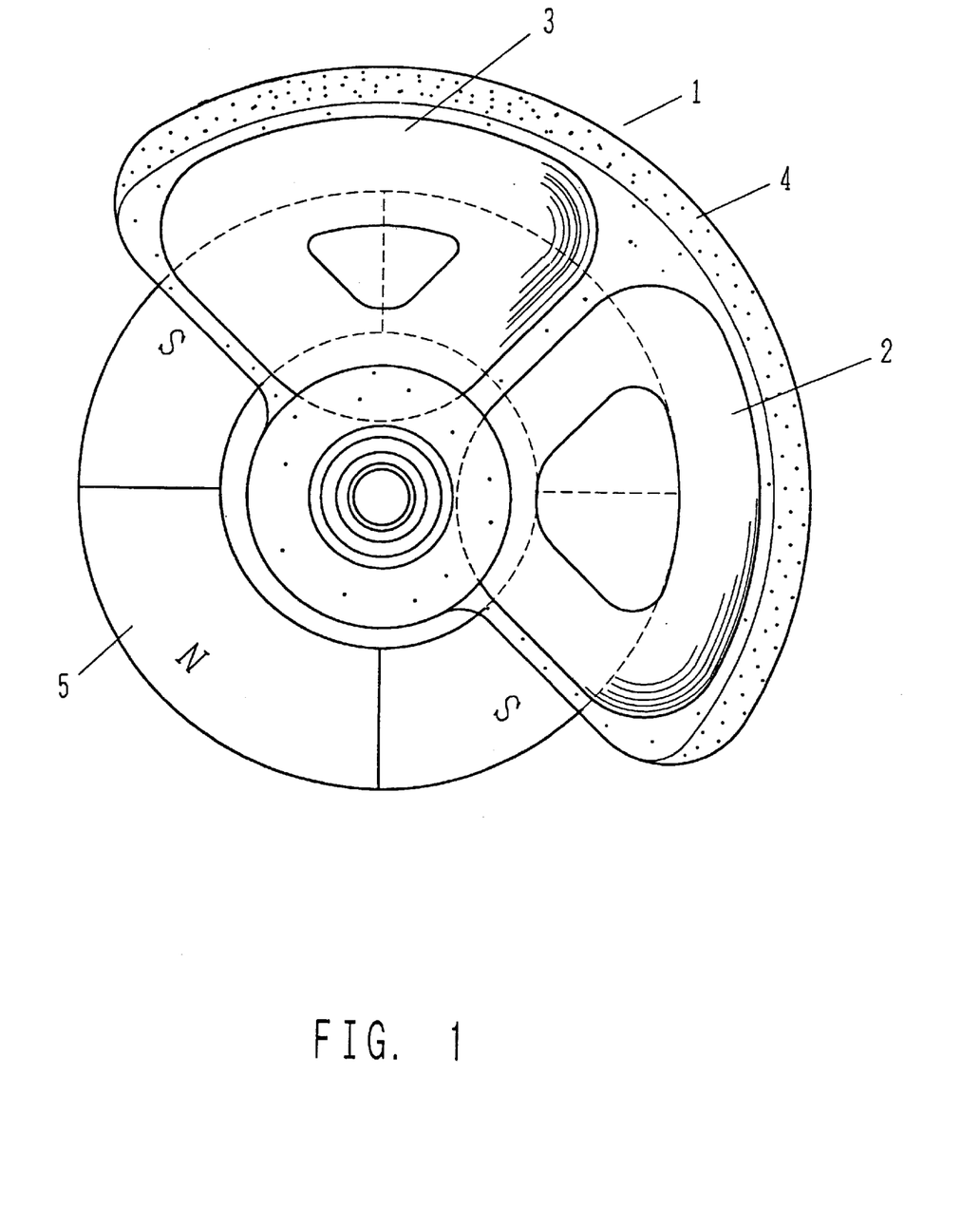
FIG. 1 is a plan view showing a first embodiment of a flat coreless vibrator motor using magnetic latching power according to the present invention, in which the relationship between the position of an eccentric rotor and the position of a magnet is shown.

Therefore, when power is not supplied, the eccentric rotor 1 stops four times, once every 90°, by the magnetic latching power of the magnetic plated coreless armature coil 2, while rotating once, so that the center of the coreless coil 2 is in the middle of the N pole and the S pole of the magnet 5.

Figure 3:
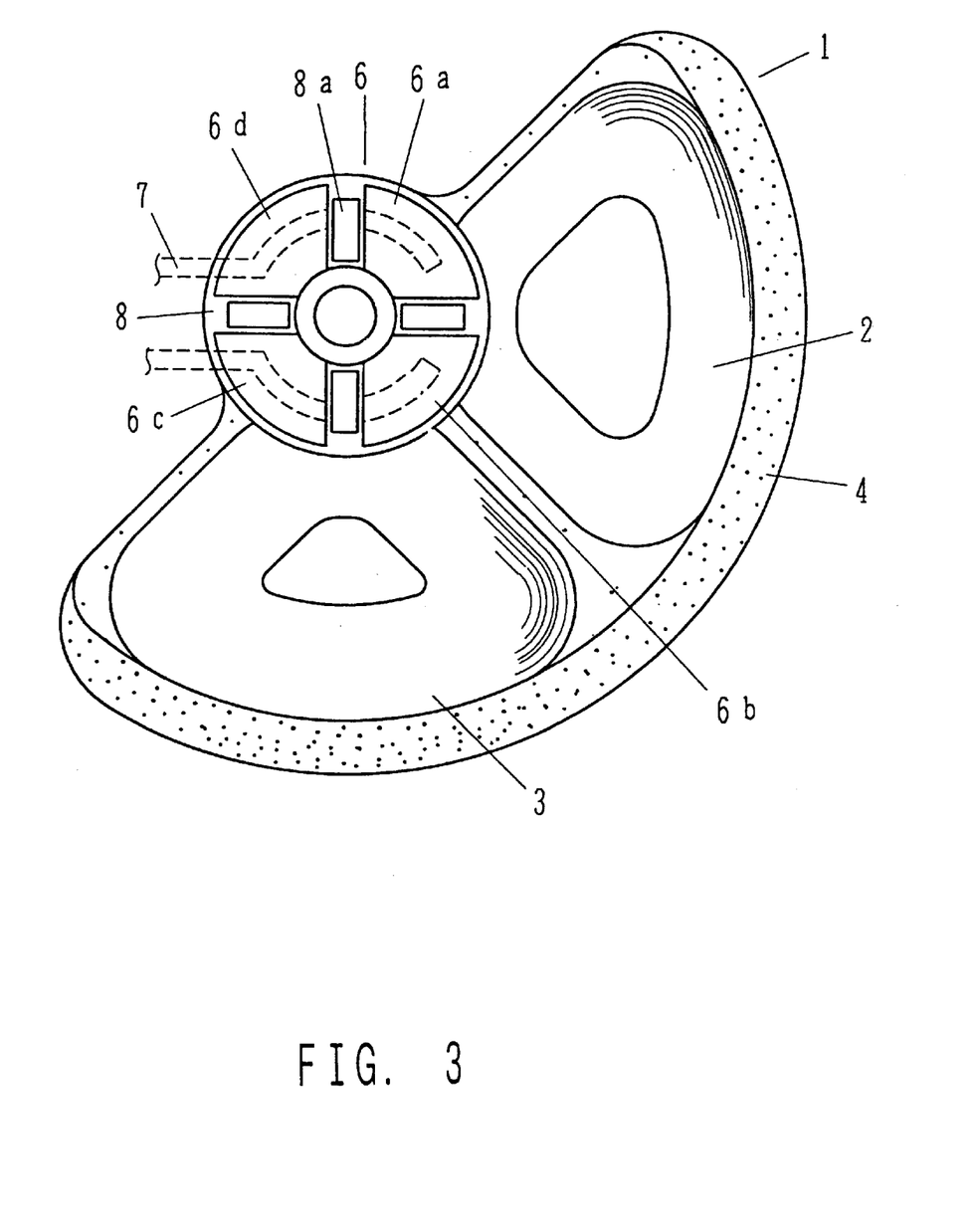
FIG. 3 is a rear view of a commutator, taken along the line III—III of FIG. 2.

A four-pole flat plate type commutator 6 which is integrally formed is corelessly installed at the center of the surface of the magnet of the eccentric rotor 1, as shown in FIG. 3.

The flat plate type commutator 6 will now be described with reference to FIG. 3. FIG. 3 is a rear view taken along the line III—III of FIG. 2. The flat plate type commutator 6 is formed of a printed circuit pattern so that the central angles of the respective segments 6a, 6b, 6c, and 6d are 90° apart. The surface of the flat plate type commutator 6 is plated with a precious metal. Reference numeral 7 denotes a pair of brushes which are a precious metal thin plate or plated with the precious metal. The angle formed by the commutator 6 and the brush 7 is set to be 90°. Reference numeral 8 denotes a slit between the respective segments set to be relatively wide, that is, about 0.7 mm in order not to be shorted by the brushes 7.

Rectangular holes 8a opened in the slit 8 become the paths of the high density, slippery synthetic resin 4 when the high density, slippery synthetic resin 4 is molded. The high density, slippery synthetic resin 4 is supplied through the rectangular holes 8a. A protrusion 8c both sides of which are concave portions 8b is integrally formed of the high density, slippery synthetic resin 4. Therefore, even though the precious metal thin plate brush 7 passes over the slit 8, the adjacent segments (for example, 6a and 6d) are not shorted to each other. A large step difference is removed in the slit 8 due to the protrusion 8c. Therefore, since the eccentric rotor 1 can smoothly rotate, the eccentric rotor 1 stops in a specific position, that is, in the position shown in FIG. 1 (the other three segments stop in specific positions) using the magnetic attractive power of the coreless coil 2 formed of the magnetic plated wire. Accordingly, the following movement of the rotor is facilitated. Also, only one concave portion 8b (in the opposite side of the direction of rotation) may exist if the direction of rotation of the eccentric rotor is uniform. The concave portions 8b are provided in order to prevent the protrusion 8c of the high density, slippery synthetic resin 4 from being abraded by the sliding of the brushes and abraded power from moving to the segments 6a, 6b, 6c, and 6d and being put on the segments 6a, 6b, 6c, and 6d.

Figure 2:
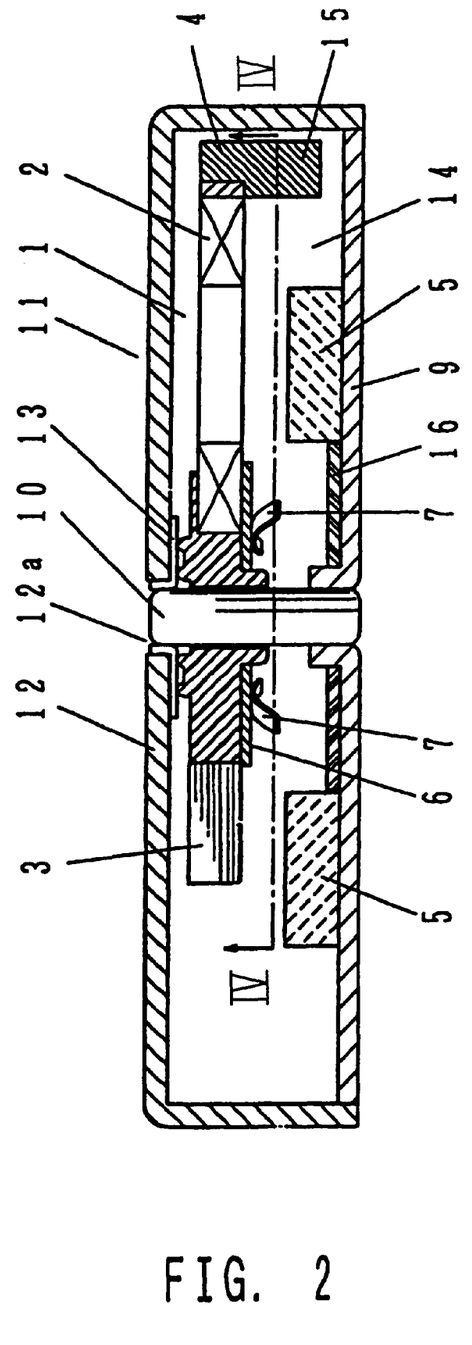
FIG. 2 is a side sectional view of the first embodiment of the flat coreless vibrator motor.

The structure of the flat coreless vibrator motor using the eccentric rotor 1 is shown in FIG. 2. A thin axis 10 fixed at the middle of a bracket 9 rotatably supports the eccentric rotor 1. The leading end of the axis 10 is inserted into a through hole 12a of a case 12 which constitutes a housing 11 through a slide washer 13. Accordingly, the flat coreless vibrator motor can withstand shocks from the side. The eccentric rotor 1 is arranged through a gap by interposing a convex portion 15 in a space 14 between the outer diameter of the magnet 5 and the inner periphery of the case 12, using the fact that the magnet 5 has a small diameter.

Since the center of gravity of the eccentric rotor 1 significantly tilts to the convex portion 15 of the outer periphery, the eccentric rotor 1 can contribute to the production of a centrifugal force, that is, the vibration. Reference numeral 16 denotes a flexible substrate for installing the brushes 7 thereon, the brushes supplying power from the outside.

Figure 4:
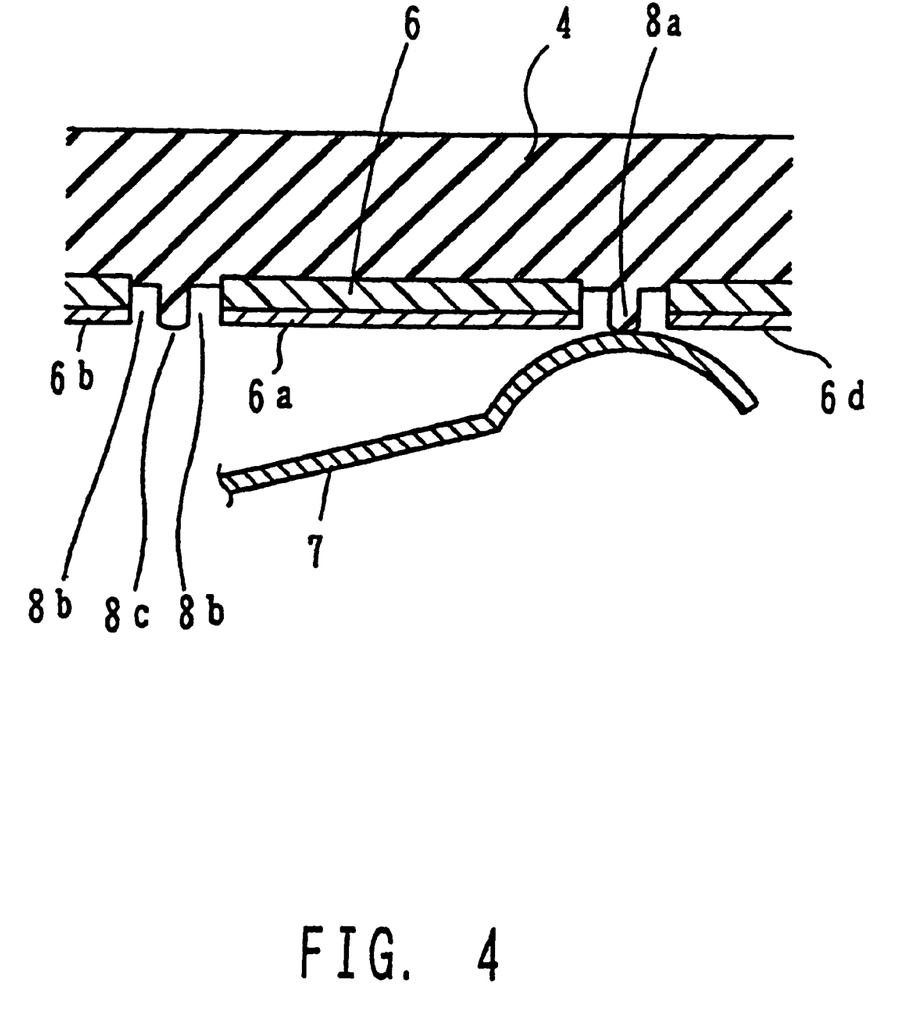
FIG. 4 is a sectional view showing the enlarged main portions of a flat plate type commutator and a brush which are main members of the flat coreless vibrator motor.
Figure 5:
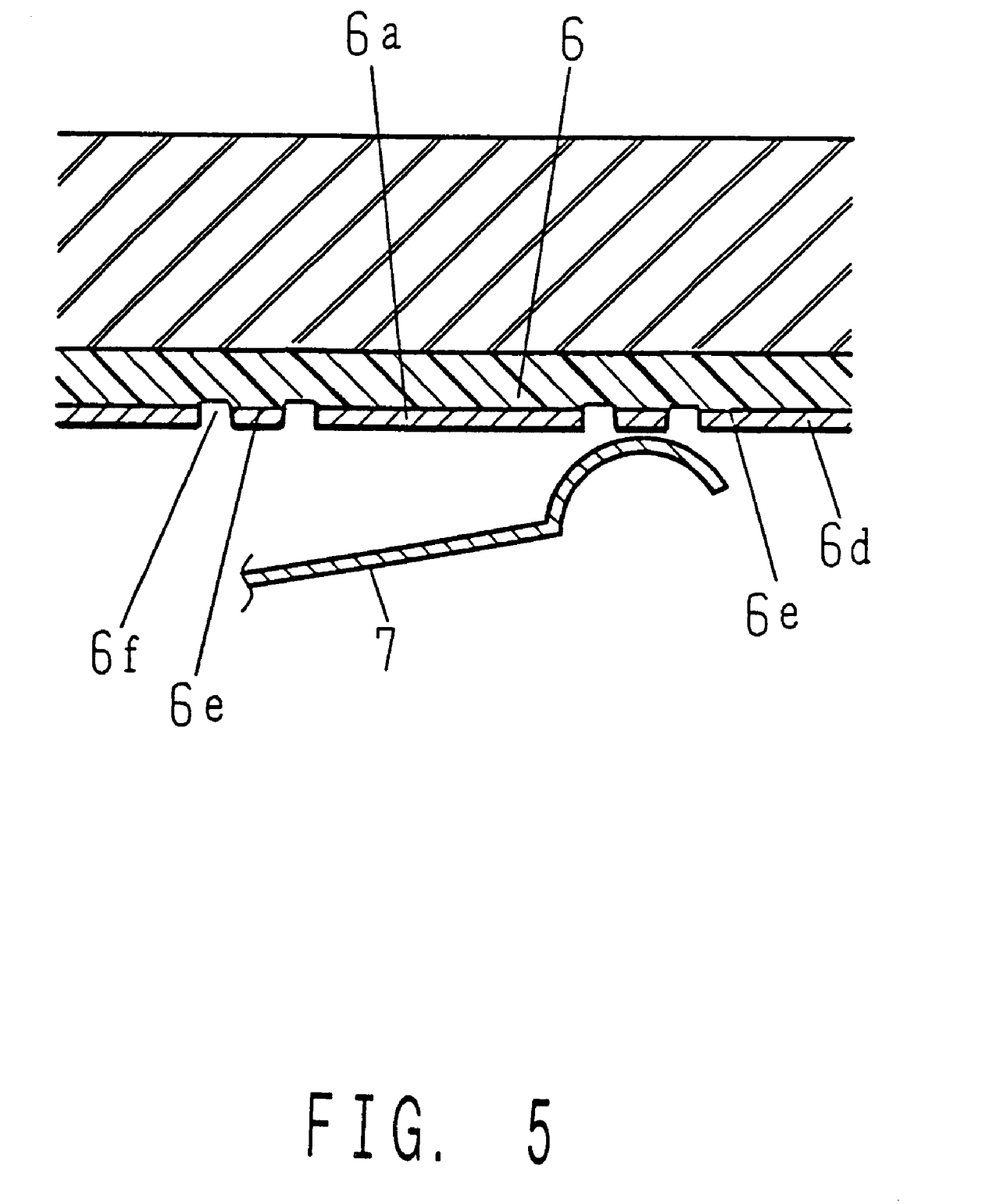
FIG. 5 is a sectional view showing the enlarged main portion of a modification of FIG. 4.

FIG. 5 shows that the protrusion is formed of a printed circuit board in the modification of FIG. 4.

Namely, the segments 6a, 6b, 6c, and 6d and protrusion patterns 6e arranged among the segments are formed of a well-known printed circuit technology and a concave portion 6f is formed by etching.

Figure 6:
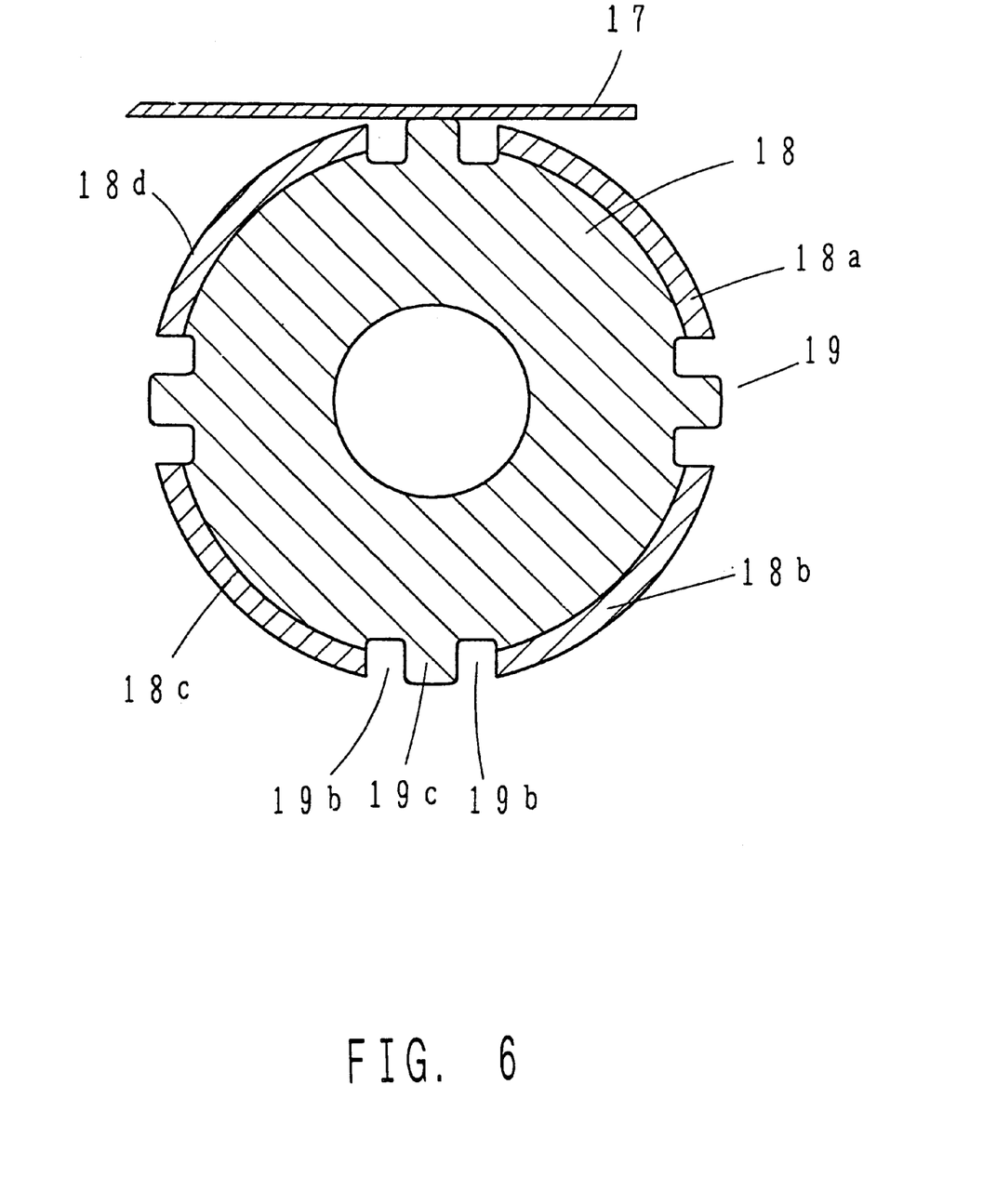
FIG. 6 is a sectional view showing the enlarged main portions of a cylindrical commutator and a brush according to a second embodiment of the present invention.

FIG. 6 is a sectional view showing a relationship between a cylindrical commutator and a brush as a second embodiment of the present invention.

In FIG. 6, reference numeral 17 denotes a plate type brush, which is a precious metal thin plate or plated with a precious metal. Reference numeral 18 is a cylindrical commutator having a printed circuit pattern around the outer periphery thereof, on which a plating of a precious metal is formed to provide segments 18a, 18b, 18c, and 18d divided by about four so that the central angles of the segments 18a, 18b, 18c, and 18d are 9°. Reference numeral 19 denote slits among the respective segments. The slits 19 are relatively wide in order to prevent the adjacent segments from being shorted by the brush 17. Reference numerals 19b and 19c denote a concave portion and a protrusion, respectively. Although only one plate type brush is shown, it is apparent that the other brush exists. In FIG. 6, the brush is described to stop at the protrusion 19c in order to clarify the operation of the brush. However, the brush does not actually stop at the protrusion 19c.

The principle of the rotation of the flat coreless vibrator motor will now be described with reference to FIGS. 7 through 9. The wiring relationship in FIGS. 7 through 9 will now be described. The winding end of the coreless armature coil 2 formed of the magnetic plated wire of the eccentric rotor 1 is connected to the winding end of the general coreless armature coil 3. The winding start of the coreless armature coil 2 is wired to the segments 6a and 6b of the commutator 6. The commutator 6 is constructed so that the each pair of diametrically-opposite segments 6a and 6c and 6b and 6d are shorted and are at the same potential.

Figure 7:
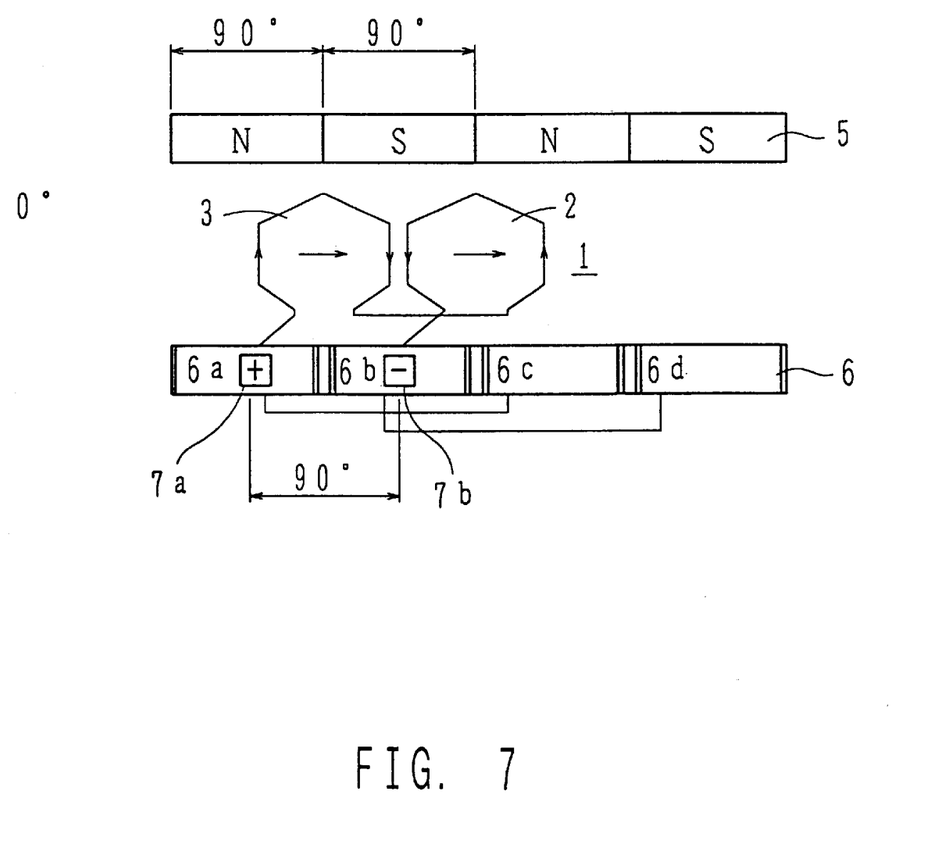
FIGS. 7, 8, and 9 explain the principle of rotation of the flat coreless vibrator motor.

The eccentric rotor 1 stops at the position shown in FIG. 7 by the magnetic latching power of the coreless armature coil 2 formed of the magnetic plated wire. When current is applied to the coreless armature coils 2 and 3 in this state, current flows to the respective coils in directions indicated by arrows through a pair of positive and negative brushes 7a and 7b. As a result, according to Fleming's left-hand rule, power is generated to the right, thus rotating the rotor.

Figure 8:
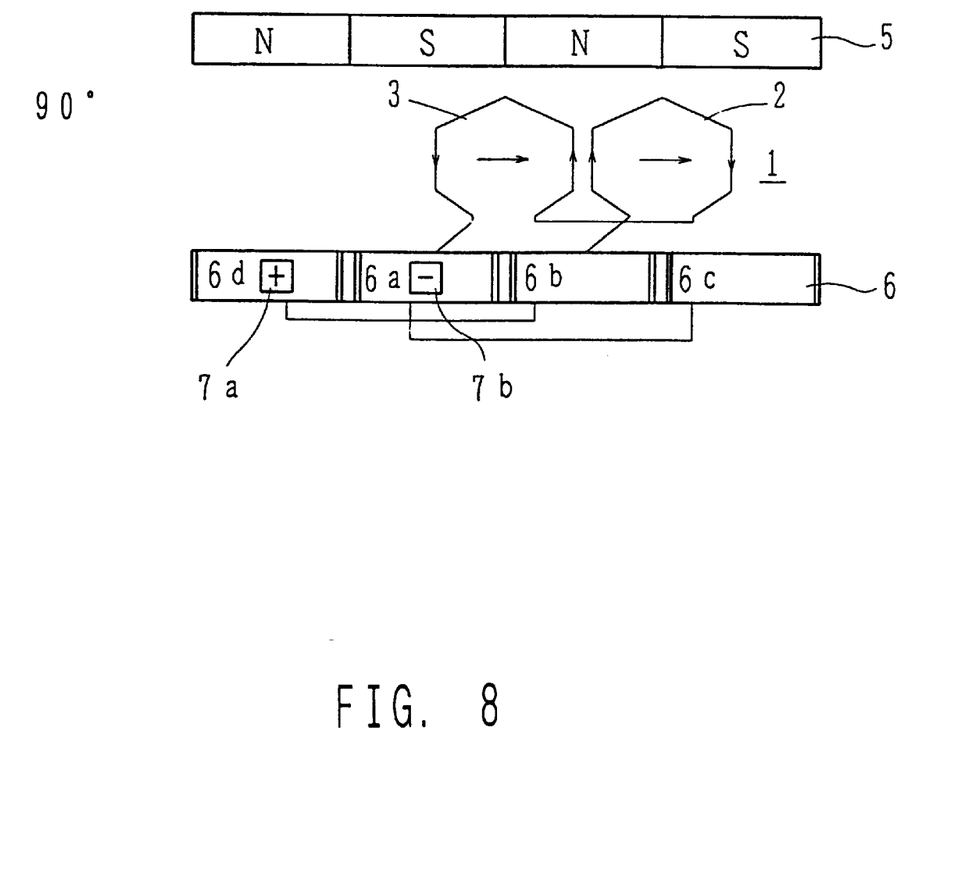

When the commutator 6 and the eccentric rotor 1 rotate 90° and are at the position shown in FIG. 8, current flows to the coils 2 and 3 in a reverse direction. Accordingly, the polarities of the magnets which face the coils are exchanged, to thus generate power to the right according to Fleming's left-hand rule. Therefore, the rotation of the rotor continues. When the commutator 6 and the eccentric rotor 1 rotate 90° again, thus rotating 180° as a result, the commutator 6 and the eccentric rotor 1 operate in the way shown in FIG. 7 although the positions thereof are different from the positions shown in FIG. 7.

Figure 9:
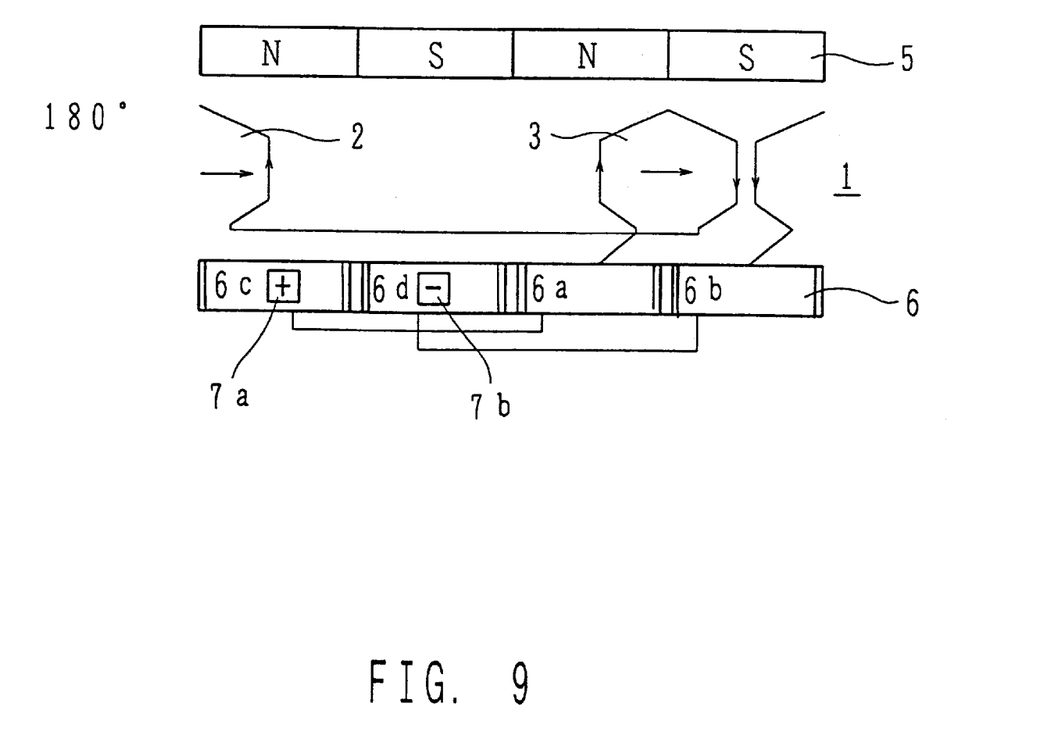

As noted from FIGS. 7 through 9, current does not flow through the coreless armature coils 2 and 3 since the brushes 7a and 7b are mounted on the protrusion 8c in the slit of the commutator 6 every 45°. However, the brushes 7a and 7b do not stop at the slit due to the inertia of the rotor when the rotor rotates and due to the magnetic latching power of the coreless armature coil 2 formed of the magnetic plated wire when current does not flow through the coreless armature coils 2 and 3.

It is not necessary for the respective coils to have the same shapes and sizes. It is not necessary for the central angles of the respective segments of the commutator 6 or the central angles of the brushes 7a and 7b to be 9°. It is possible to reduce the time for which current does not flow through the coreless armature coils 2 and 3 by making the central angles different from each other.

Figure 10:
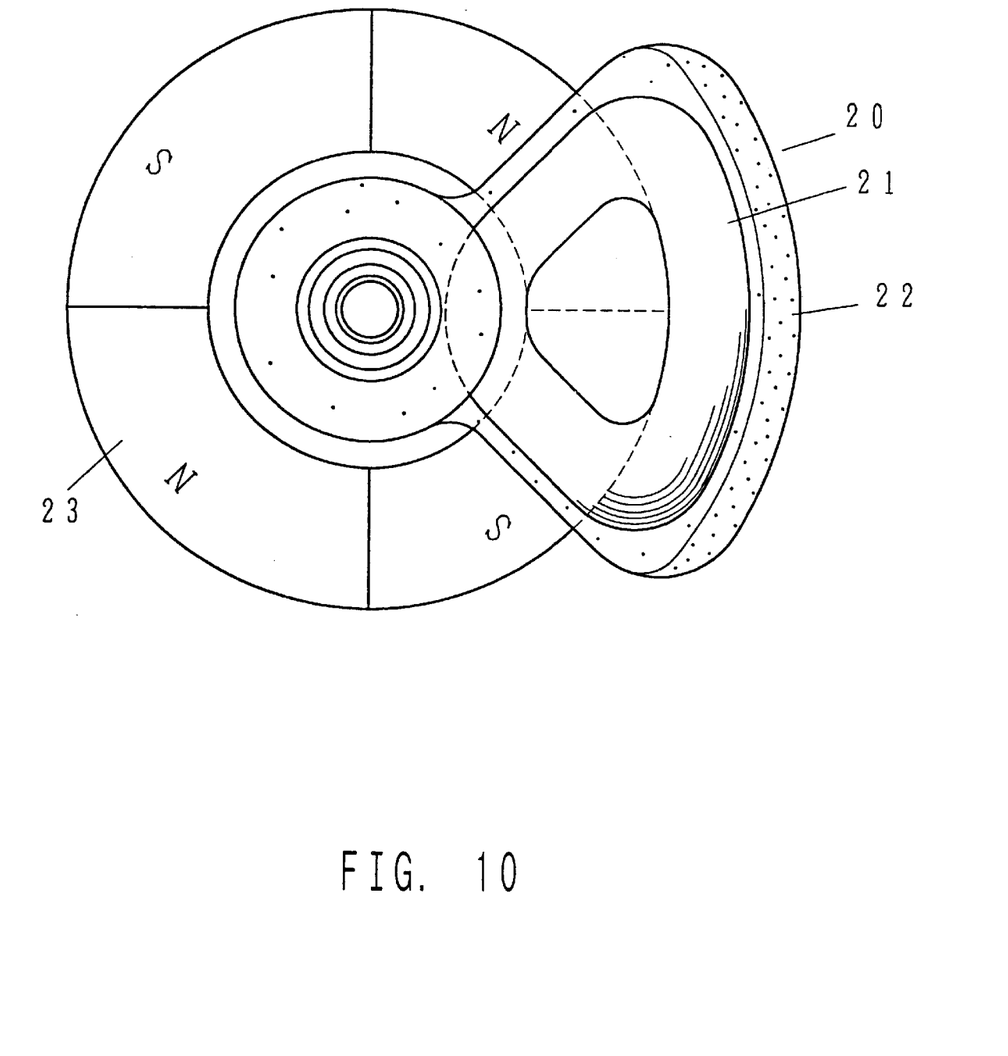
FIG. 10 is a plan view showing the main portions according to a third embodiment of the flat coreless vibrator motor according to the present invention.

In the above embodiment, the flat coreless vibrator motor was described to have two coils since relatively strong power is required. However, if strong power is not required, the flat coreless vibrator motor can have one coil, as shown in FIG. 10. Namely, FIG. 10 shows the third embodiment of the present invention. In FIG. 10, reference numeral 20 denotes an eccentric rotor. The eccentric rotor 20 is integrally formed of a slippery synthetic resin 22 with one coreless armature coil 21 tilted to one side. The coreless armature coil is formed by winding the magnetic plated wire having the very thin plating, as described in the first embodiment. The coreless armature coil 2 formed by winding the magnetic plated wire to have a relatively larger winding axis and a smaller number of windings than the other coreless armature coil in order to avoid large magnetic attractive power. A magnet 23 of a disk-shape having a central hole, is magnetized so that it has alternate north and south poles N and S and is divided by four. The width of the magnet 23, that is, the difference between the outer diameter of the magnet 23 and the inner diameter of the magnet 23 is almost equal to the inner diameter of the available conductor. Therefore, the eccentric rotor 20 stops four times every 90°, by the magnetic latching power of the magnetic plated coreless coil 21, while rotating once, so that the center of the coreless coil 21 stops in the middle of the N pole and the S pole of the magnet 23, as shown in FIGS. 7 through 9.

While this invention has been particularly shown and described with reference to preferred embodiments thereof, it will be understood by those skilled in the art that various changes in form and details may be made therein without departing from the spirit and scope of the invention as defined by the appended claims.

According to the present invention, it is possible provide a flat coreless vibrator motor capable of holding a rotor in a specific position so as to effectively obtain a magnetic flux from a magnet by magnetic latching power, increasing vibration by increasing the amount of eccentricity of the center of gravity of the rotor, improving the mobility of the rotor since the adjacent segments of a commutator are not shorted, and whose manufacturing expenses are cut down by reducing the number of coils or the available area of a magnet.

To be specific, it is possible to improve the mobility of the flat coreless vibrator motor since the eccentric rotor is held in a specific position when it stops and to prevent adjacent segments from being shorted by the protrusion.

It is possible to prevent abrasion powder such as a synthetic resin from gathering in the concave part of the protrusion and coming out to the surfaces of the segments.

It is possible to easily form the protrusion.

It is possible to hold the eccentric rotor in the specific position by only a coil when it stops.

It is possible to reduce mobility torque since the magnetic latching power is not so large.

It is possible not to increase the manufacturing expenses of a magnet and to firmly hold the eccentric rotor in the specific position by the available conductor portions of the coil since the unavailable conductor portions of the coil is not attracted by the magnet.

What is claimed is:

1. A flat coreless vibrator motor using magnetic latching power, the motor comprising:
   an eccentric rotor including, at one side, at least one coreless coil, and a commutator having segments;
   a magnet for providing a magnetic field to the eccentric rotor;
   means for holding the at least one coreless coil of the eccentric rotor in a fixed position using the magnetic field of the magnet;
   a pair of brushes for supplying power to the eccentric rotor through the commutator; and
   a protrusion located between and electrically isolated from adjacent segments of the commutator, the protrusion having a surface coplanar with the adjacent segments of the commutator for sliding contact with the brushes so that the adjacent segments of the commutator are not short-circuited by the brushes.

2. The flat coreless vibrator motor of claim 1, including a groove at one side of the protrusion separating the protrusion from an adjacent segment of the commutator.

3. The flat coreless vibrator motor of claim 2, including first and second coreless coils, wherein the first coreless coil includes wound magnetic plated wire for holding the coreless coils at fixed positions.

4. The flat coreless vibrator motor of claim 2, wherein the magnet has a width and the coil has an inner diameter and the width is substantially equal to the inner diameter.

5. The flat coreless vibrator motor of claim 2, including a printed circuit board, wherein the commutator is planar and located on the printed circuit board, and the protrusion is part of the printed circuit board.

6. The flat coreless vibrator motor of claim 5, including first and second coreless coils, wherein the first coreless coil includes wound magnetic plated wire for holding the coreless coils at fixed positions.

7. The flat coreless vibrator motor of claim 5, wherein the magnet has a width and the coil has an inner diameter and the width is substantially equal to the inner diameter.

8. The flat coreless vibrator motor of claim 1, including first and second coreless coils, wherein the first coreless coil includes wound magnetic plated wire for holding the coreless coils at fixed positions.

9. The flat coreless vibrator motor of claim 8, wherein the first coreless coil has one of a smaller number of windings than the second coreless coil and more magnetic latching power than the second coreless coil.

10. The flat coreless vibrator motor of claim 8, wherein the magnet has a width and the coil has an inner diameter and the width is substantially equal to the inner diameter.

11. The flat coreless vibrator motor of claim 1, wherein the magnet has a width and the coil has an inner diameter and the width is substantially equal to the inner diameter.

12. The flat coreless vibrator motor of claim 1 wherein the protrusion is electrically insulating.

13. The flat coreless vibrator motor of claim 1 wherein the surface of the protrusion is electrically conductive.

14. A flat coreless vibrator motor comprising:

an eccentric rotor having a side including at least one coreless coil and a commutator having four segments, each diametrically-opposite pair of the segments of the commutator being short-circuited;

a four-pole magnet which has alternating north and south poles for providing a magnetic field to the eccentric rotor;

means for holding the at least one coreless coil of the eccentric rotor so that available conductor portions are at a fixed position, when the eccentric rotor stops, due to the magnetic field of the magnet;

a pair of brushes for supplying power to the eccentric rotor through the commutator; and a protrusion located between and electrically isolated from adjacent segments of the commutator, and having a surface coplanar with surfaces of the adjacent segments of the commutator, so that adjacent segments of the commutator are not short-circuited by the brushes.

15. The flat coreless vibrator motor of claim 14 wherein the protrusion is electrically insulating.

16. The flat coreless vibrator motor of claim 14 wherein the surface of the protrusion is electrically conductive.

17. A flat coreless vibrator motor using magnetic latching power, the motor comprising:

an eccentric rotor including, at one side, at least one coreless coil, and a cylindrical commutator having cylindrical segments;

a magnet for providing a magnetic field to the eccentric rotor;

means for holding the at least one coreless coil of the eccentric rotor in a fixed position using the magnetic field of the magnet;

a pair of brushes for supplying power to the eccentric rotor through the commutator; and a protrusion located between and electrically isolated from adjacent cylindrical segments of the cylindrical commutator and having a cylindrical surface with a radius substantially identical to a cylindrical radius of the commutator segments for sliding contact with the brushes, so that the adjacent segments of the commutator are not short-circuited by the brushes.

18. The flat coreless vibrator motor of claim 17, including a groove at one side of the protrusion separating the protrusion from an adjacent segment of the commutator.

19. The flat coreless vibrator motor of claim 17, including first and second coreless coils, wherein the first coreless coil includes wound magnetic plated wire for holding the coreless coils at fixed positions.

20. The flat coreless vibrator motor of claim 17, wherein the magnet has a width and the coil has an inner diameter and the width is substantially equal to the inner diameter.

* * * * *